United States Patent [19]

Schuy

[11] 3,920,396

[45] Nov. 18, 1975

[54] METHOD AND DEVICE FOR DETERMINATION OF GASES DISSOLVED IN A LIQUID ESPECIALLY IN BLOOD

[76] Inventor: Klaus Dieter Schuy, Heidestrasse 1 b, D-4618 Kamen-Methler, Germany

[22] Filed: Mar. 8, 1973

[21] Appl. No.: 339,111

[30] Foreign Application Priority Data
Mar. 8, 1972 Germany............................ 2211032

[52] U.S. Cl. ............ 23/230 B; 23/230 R; 23/232 R; 23/254 R
[51] Int. Cl. ..................... G01n 21/00; G01n 31/00; G01n 33/16
[58] Field of Search .......... 23/232 R, 230 B, 254 R, 23/230 R

[56] References Cited
UNITED STATES PATENTS

| | | |
|---|---|---|
| 1,592,409 | 7/1926 | Zutter ............................. 23/232 R |
| 3,118,736 | 1/1974 | Taylor ............................. 23/230 B |
| 3,249,403 | 5/1966 | Bochinski et al. ............ 23/230 R X |
| 3,690,838 | 9/1972 | Luckey ......................... 23/232 R X |

Primary Examiner—Morris O. Wolk
Assistant Examiner—Michael S. Marcus
Attorney, Agent, or Firm—Wolf, Greenfield & Sacks

[57] ABSTRACT

By means of an extraction gas, circulating through a closed loop extraction system, an equilibrum is rapidly established between all gases dissolved in the liquid sample (sample volume in the $\mu l$ range) and the gas in the space above the level of said sample. A "sniffing" probe, employing a gas permeable membrane, samples the gas space, and feeds the permeating gases directly to a suitable detector, e.g. a mass spectrometer; the gases sampled in such manner from the same sample can then be measured and recorded.

11 Claims, 2 Drawing Figures

METHOD AND DEVICE FOR DETERMINATION OF GASES DISSOLVED IN A LIQUID ESPECIALLY IN BLOOD

GENERAL BACKGROUND OF THE INVENTION

The knowledge of the concentration of arbitrary gases dissolved physically or chemically in liquids is of essential importance in some fields of research and in practice, i.e. in the field of medicine for the attainment of exact information from investigations of blood, urine or body fluids, or in related fields, i.e. environmental pollution and hygienics, by the measurement or supervision of harmful or useful components in water or other liquids.

STATE OF ART

It is a known method to determine partial pressures or concentrations of gases dissolved in liquids, and especially in blood, by a combined wash-out and extraction procedure to eliminate the gas initially present in the extraction system and to replace it by an extraction gas. After complete wash-out a certain amount of the said liquid is inserted into an extraction chamber of the said extraction system and the gases dissolved in the liquid are extracted by the extraction gas. The gaseous mixture resulting from the extraction procedure within the gas space of the extraction system is subjected to an analysis procedure. Any gas which is not to be analysed itself and which does not combine with the liquid or the dissolved gas components in it may be used as extraction gas.

In the known method as described above, the gases dissolved in said liquid in the extraction chamber are completely extracted by the extraction gas which flows freely and continuously through the extraction chamber with the liquid in it, and is sampled by a sniffing probe, and then expelled from the system. The extraction (carrier) gas is either passed over the surface of the liquid sample (P. Lotz in "Kolloquium ueber Respirations-Massenspektrometrie" of 18.–20.9.1969, Bonn, Schattauer-Verlag, Stuttgart, page 85 to 93), or is bubbled through the liquid sample which, for this purpose, is supported by a frit plate (G. von Nieding in the above cited publication page 85 to 93). Concentration peaks versus time of varying width appear at the output of the mass spectrometer which is used as a gas analyser in these known devices.

In order to determine the gases not only qualitatively but also quantitatively, it is necessary to integrate manually or electronically the concentration curves which result from said analysis. This known measuring method is disadvantageous because the integration over the sometimes extended measuring periods is afflicted with a considerable loss of precision and accuracy. The known measuring system would have an essentially higher sensitivity in order to compete with the precision, accuracy and sensitivity of the method according to the present invention.

PROBLEM

The invention aims at an improved method for the analysis of gases dissolved in liquids, especially at higher detection sensitivity, better precision and accuracy than by the known method.

In the solution to this problem, the invention is based on the realization that the extraction must be performed not under continuous expulsion but under accumulation of the gases which are extracted gradually from the liquid sample during the extraction procedure.

SOLUTION

Proceeding on the above considerations, a satisfying solution to the present problem has been found according to the present invention whereby the extraction system, after termination of said wash-out procedure, is changed over to a self-contained (closed) condition, that the liquid sample is inserted into the closed extraction system, that by effecting said extraction within the closed extraction system, the thermodynamic equilibrium between all gases dissolved in the liquid and the gases in the gas space, respectively, is established, and that said analysis of the gaseous mixture available in the gas space is effected after establishment of said equilibrium with the extraction system still in self-contained (closed) condition. The thermodynamic equilibrium between the number of gas molecules still dissolved in the liquid and the number of gas molecules in the gas space of the closed system is established after some time owing to the influence of the extraction (carrier) gas, and the signal of said detector will reach a constant value as soon as the equilibrium is reached. High sensitivities, precisions and accuracies are achieved because losses of gas during the entire measurement procedure are insignificant. In contrast to the known method, where integration of the peaks is required, the present method is self-integrating.

The extraction may be effected during circulation of the extraction gas through the extraction chamber. The extraction may be accelerated by that the extraction gas is bubbled through the liquid sample, however, not in an open but in a closed loop system. A calibration may be obtained in a simple and reliable manner by that, after termination of the analysis of the interesting gaseous mixture (main analysis), the extraction system with the liquid sample in it is, once more, subjected to a wash-out procedure for driving out and replacing the gas mixture then present in the extraction system by said extraction gas; that subsequently the extraction system is once more closed and a known volume of a calibration gas mixture consisting of the interesting gases and said extraction gas with exactly known concentration ratios is inserted into the extraction chamber; that by thermodynamic processes within the closed loop extraction system the equilibrium between all gases dissolved in the liquid and the gases in the gas space of the extraction system, respectively, is established, and that the analysis of the gas mixture then available in the gas space for calibration of the main analysis is effected after completion of said equilibrium with the extraction system still closed.

The method according to the invention provides self-integrated signals and it is not necessary to stabilize a continuous flow of gas during the process of extraction, whereas the known method is not self-integrating and the gas flow must be kept highly constant. Furthermore, the new method is superior to the old method by virtue of its simplicity and because the solubility coefficient of the gas in the liquid sample needs not be known owing to the fact that the same liquid is used during the measurement as well as during the calibration, and because the loss of liquid by evaporation during the entire extraction or wash-out process prior to the injection of the gas mixture for calibration amounts to less than 0,5% of the liquid volume and, therefore, is negligibly small. Both measurement and calibration can be completed within a short period of time and are easily carried out.

Figure 1:
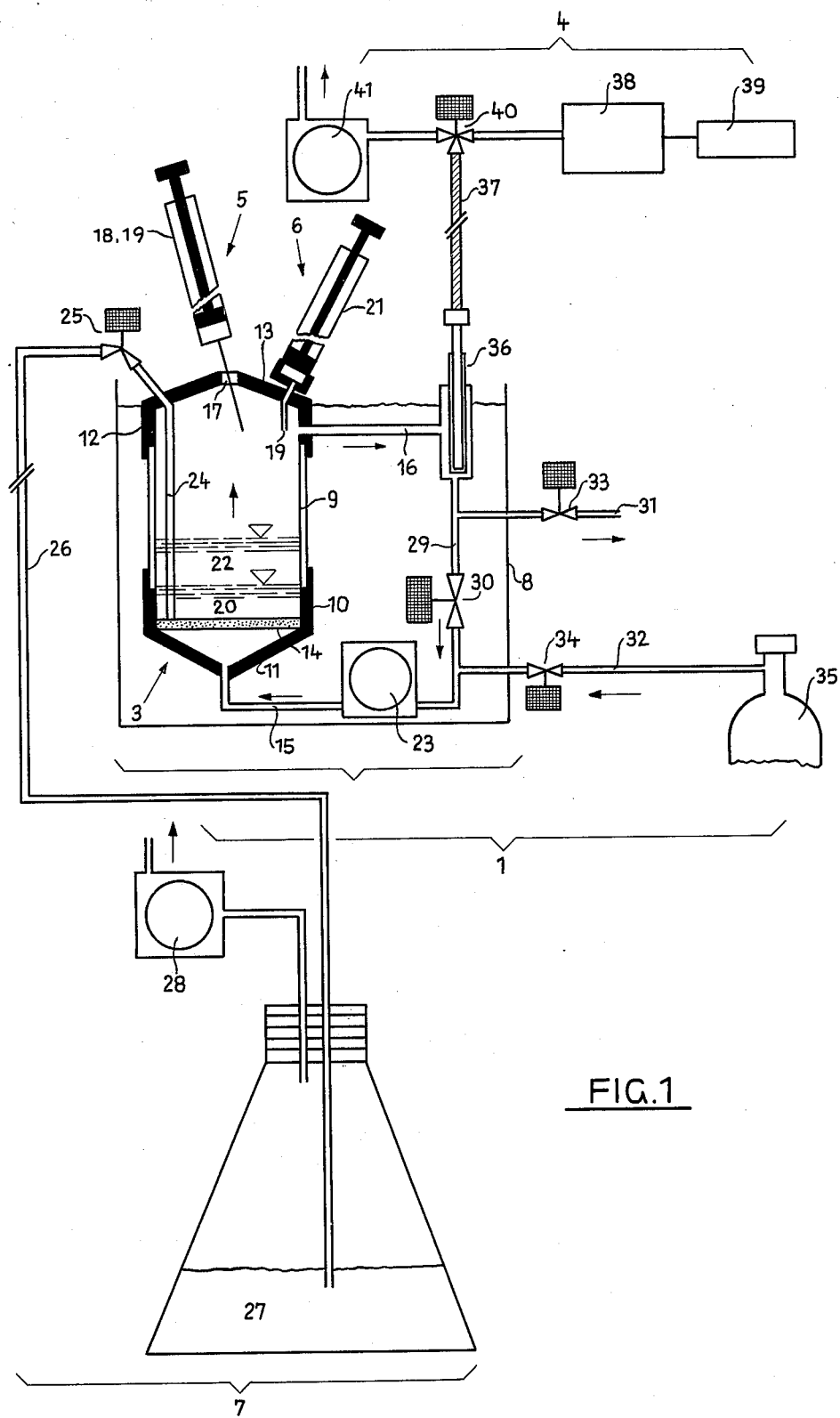
FIG. 1 is a schematic drawing of a first embodiment of the invention which is given by way of example.

The apparatus shown in FIG. 1 is described in connection with a determination of gases dissolved in blood and, in principle, consists of a combined wash-out and extraction system 1, 2, including an extraction chamber 3, a detection (analysing) system 4, and means 5, 6, 7 for the insertion of a liquid sample, an auxiliary liquid, and for the removal of the liquid subsequent to the measurement. The total volume of the extraction system 2 is 10 ml in a system built.

The extraction system is kept at constant temperature by being immersed in thermostated bath 8. The extraction chamber 3 is formed by a circular vessel which consists of several parts and can, quickly and easily, be disassembled or assembled and hermetically sealed. A middle section of said vessel consists of a glass tube 9 and can be clamped between the lower and upper parts of said vessel, namely a lower part 10 with bottom 11, and an upper part 12 with cover 13. A circular, gas-permeable frit plate 14 is mounted in the lower part 10. This frit plate 14 supports the liquid. Connection pipes 15, 16 of the wash-out and extraction system join the extraction chamber 3.

The cover 13 contains an exchangeable septum 17 through which the accurately known volume of liquid sample or calibration gas is inserted by high precision syringes 18, 19 (only one syringe is shown in the drawing).

Because, in blood, certain gases are both physically dissolved and chemically bound, it is necessary to break the chemical bonds by known methods. One such known method is the addition of a small amount of Van Slyke solution to the blood sample. A further syringe 21 serves to insert the Van Slyke solution into the extraction chamber 3.

Said Van Slyke solution 20, together with the blood sample 22, is held by the frit plate 14, thus forming a liquid space above the frit plate, leaving a gas space above the liquid.

A suction pipe 24 is provided which extends through the cover 13 downwards to the frit plate 14 and is connected by a pipe 26 with a valve 25 to a waste-liquid container 27. The blood sample 22, together with the Van Slyke solution 20 can, therefore, be transferred to the waste-liquid container 27 by a small pump 28 after the measurement is completed.

The extraction chamber 3 is part of a closed loop circulation system in which the extraction gas, e.g. helium, is circulated by a small gas-tight pump 23, through pipe 15, frit plate 14, said Van Slyke solution 20 and sample 22, said gas space above the liquid, pipe 16 and a return pipe 29 for renewed circulation to pump 23.

A cut-off valve 30 is mounted in the return pipe 29. Gas pipes 31, 32 (for wash-out) with cut-off valves 33, 34 (wash-out valves) join the upper and lower end of the cut-off valve 30, respectively. Wash-out pipe 32 is connected to a source of extraction gas 35, whereas the wash-out pipe 31 is the exhaust.

A sniffing probe 36 is sealed into pipe 16. The sniffing probe 36 is connected by a capillary tube 37 to a detector which preferably consists of a mass spectrometer 38 with a recorder 39.

A two-way valve 40 is arranged between capillary tube 37 and the inlet of the mass spectrometer 38 by which capillary tube 37 may be disconnected from the mass spectrometer 38, and may be connected to a vacuum pump 41.

The determination of the concentrations of the gases dissolved in the liquid sample is carried out in the above described system by the following steps of procedure:

1. Insertion of the Van Slyke Solution

For the analysis of a blood sample, at first, a small volume of Van Slyke solution 20 (typically 200 l) is inserted, by means of syringe 21, into the extraction chamber 3.

2. First Wash-Out Procedure

The cut-off valve 30 is closed and the wash-out valves 33, 34 are opened. The wash-out process commences such that, at first, the residual gases, e.g. air or a gaseous mixture from a previous measurement still present in the extraction system 2, including the gases dissolved in the inserted Van Slyke solution, are expelled and, secondly, replaced by an extraction gas, e.g. Ar, He, $N_2$, $SF_6$ or any other pure gas except those gases which shall be measured. This wash-out process is normally concluded within about 10 seconds.

3. First Closing of the Extraction System

When the wash-out process is completed, the extraction system 2 is closed by shutting the wash-out valves 33, 34 and opening the cut-off valve 30.

4. Insertion of the Sample

Subsequent to closing the extraction system 2, a small volume of, e.g. 200 or 250 l, blood is inserted with syringe 18 through septum 17 into the extraction chamber 3.

5. Extraction Procedure

Following step 4, the gas-tight pump 23 circulates the gas contained in the closed loop system until equilibrium between liquid and gas phase is established. The time to reach this equilibrium depends on the coefficient of solubility of the gas in the liquid and may range from several seconds to several minutes. The concentration of any gas dissolved in the blood sample, when in equilibrium, is directly proportional to the partial pressure of that gas within the gas space of the closed extraction system. Owing to the action of the Van Slyke solution, this is true also for the gas $O_2$, normally chemically bound to blood particles.

6. Recording of Measuring Curves

The detector (analyser) may be of use during all steps of the procedure. The amplitude of the detector signals is proportional to the partial pressure of the respective gas in the gas phase. The number of gases which are measured simultaneously or quasi-simultaneously depends on the number of measuring channels available in the detector (analyser).

Following the recording of the measuring curves, a calibration may be performed in order to determine the factors of proportionality and the absolute values of concentration of the respective gases dissolved in the original blood sample. This is done by adding the following steps of procedure:

7. Second Wash-Out Procedure

Subsequent to the recording of the measuring curves of the gases to be determined, the extraction system with the liquid sample 22 and the Van Slyke solution 20 in it is, once more, subjected to a wash-out process by the extraction gas from source 35 by closing cut-off valve 30, and opening wash-out valves 33, 34 so that all gases present in the extraction system 2 (except the extraction gas itself) are expelled and completely replaced by the extraction gas. The time to reach a complete wash-out depends on the temperature within the extraction system and on the solubility coefficients of the gases dissolved in the liquid, and may require only a few seconds at a temperature between 30 and 40 C.

8. Second Closing of the Extraction System

Following the second wash-out process, the extraction system is, once more, closed (viz. step 3 above).

9. Insertion of a Calibration Gas Mixture

Then, an accurately known volume of a calibration gas mixture (e.g. 200 l) is inserted by syringe 19. The calibration gas contains all gases to be measured in accurately known amounts.

10. Equilibrating Procedure

An equilibrium between liquid and gas phase is again established after a short lapse of time by circulating the gas in the closed loop condition of the extraction system (viz. step 5 above).

11. Recording of Calibration Curves

The curves recorded by recorder 39 in step 10 above calibrate the measurements obtained in step 6 above; the signal height recorded relates the known concentrations of the calibration gas to the unknown gas concentrations of the blood sample, both in the gas phase, by the (linear) mass spectrometer response.

Figure 2:
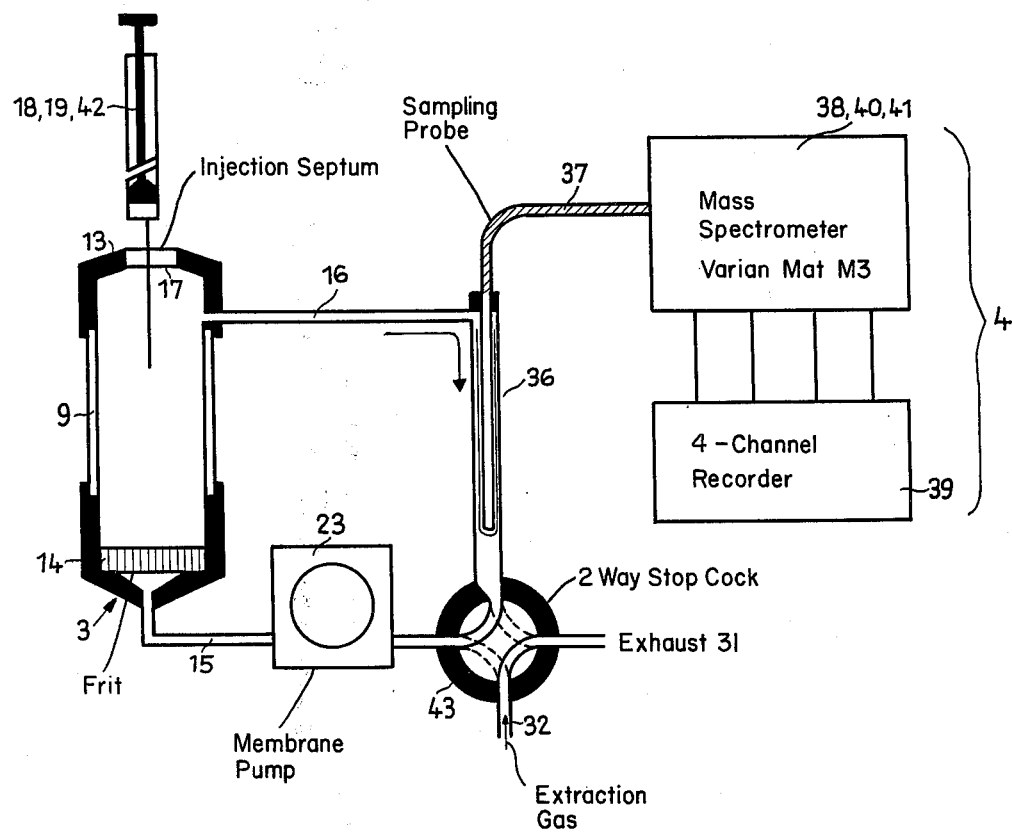
FIG. 2 is a schematic drawing of another embodiment which is also given by way of example.

The arrangement shown in FIG. 2 is a simplified version of that shown in FIG. 1. It differs from the arrangement shown in FIG. 1 by the following points:

There is only one opening in the lid of the extraction chamber 3 which is fitted with a quick-fit septum 17. Auxiliary sample 20, liquid sample 22, and calibration gas mixture are injected through this septum 17 by precision syringes 18, 19, 42. Waste liquid is removed from the extraction chamber by means of a rubber tube (not shown) which is inserted through the opening in the cover 13, after the septem 17 is removed and which extends downwards to the frit plate 20, and which is connected to a pump (not shown).

The cut-off valves 30, 33, 34 (viz. FIG. 1) are combined into a two-way stop cock 43 which enables the synchronous change-over from an open system (washout procedure) to a closed loop position (extraction, measurement and calibration procedure).

Modifications and other embodiments are possible. Thus, equilibrium by extraction need not be produced by circulation in a closed loop system, but could also be effected otherwise, e.g. by stirring up the liquid or by spraying the liquid into the closed extraction chamber.

Analyses of the extracted gases need not be carried out by mass spectroscopy but may be effected by other suitable methods as, for instance, by absorption spectroscopy (ultraviolet, infrared or visible radiation) for which procedure the extraction chamber, or a part of it, may be used as an absorption cell.

What I claim is:

1. In a method to determine the partial pressures or concentrations of gases dissolved in a liquid, and especially in blood, employing a loop extraction system for eliminating gases initially present in the system by washing-out the gases by an extraction gas, followed by the insertion of a predetermined amount of said liquid into an extraction chamber of said extraction system, in order to extract the said dissolved gases by said extraction gas, and subject the gas mixture arising from the extraction step to an analysis procedure using spectroscopic detection means, the improvement comprising;

after termination of the wash-out step, closing the extraction system, inserting the liquid sample into the extraction chamber of the closed extraction system, forcibly circulating the extraction gas through the liquid sample until there is thermodynamic equilibrium between all gases dissolved in the liquid sample and the mixture of gases in the gas space of the extraction chamber, sampling a part of the circulated gases, and transmitting the sampled part to said spectroscopic detection means whereby the gaseous mixture available in the gas space after establishment of equilibrium and with the extraction system still closed is analysed.

2. The method of claim 1 comprising the following additional steps for the purpose of calibration;

after termination of the analysis of the gas mixture, the extraction system with the liquid sample in it is, once more, subjected to a wash-out step for driving out and replacing the gas mixture then present in the extraction system by the extraction gas, closing the extraction system, inserting into the extraction chamber a known volume of a calibration gas mixture consisting of gases like said gases to be detected and said extraction gas with known concentration ratios, forcibly circulating the calibration gas mixture and extraction gas through said liquid until there is thermodynamic equilibrium between all gases dissolved in the liquid and the gases in the gas space of the extraction system, and analysing the gaseous mixture available in the gas space for calibration of the extraction system with the system still closed.

3. The method of claim 1 wherein the extraction gas is bubbled through the liquid sample with the system in a closed condition.

4. The method of claim 3 comprising the following additional steps for the purpose of calibration;

after termination of the analysis of the gas mixture, the extraction system with the liquid sample in it is, once more, subjected to a wash-out step for driving out and replacing the gas mixture then present in the extraction system by the extraction gas, closing the extraction system, inserting into the extraction chamber a known volume of a calibration gas mixture consisting of gases like said gases to be detected and said extraction gas with known concentration ratios, forcibly circulating the calibration gas mixture and extraction gas through said liquid until there is thermodynamic equilibrium between all gases dissolved in the liquid and the gases in the gas space of the extraction system, and analysing the gaseous mixture available in the gas space for calibration of the extraction system with the system still closed.

5. The method of claim 1 wherein the step of sampling a part of the circulated gas includes the step of inserting a probe into the closed system for extracting the part.

6. The method of claim 1 wherein the step of forcibly circulating including the step of providing a pump for pumping the gases through the closed system.

7. A system for determining the partial pressures or concentrations of gases dissolved in a liquid, and especially blood, said system comprising an extraction apparatus including an extraction chamber, said extraction chamber including a first inlet means, for receiving extraction gas, located in the bottom portion of the extraction chamber, a second inlet means, for receiving a liquid sample, located in the upper portion of said extraction chamber, and an outlet means located in the upper portion of said extraction chamber a source of extraction gas, means for coupling the source of extraction gas to the first inlet means and means connected to said outlet means for exhausting the gas from the chamber, a switching means having a first position for coupling said source of extraction gas to the first inlet means of the extraction chamber and the outlet means of the extraction chamber with an exhaust means, and a second position for forming a closed loop system wherein the first inlet means and outlet means of the extraction chamber are connected via a pump means, said pump means used for circulating the gas in the closed loop system when said switch means is in its second position, means for sampling a part of the circulated gases, and means for analysing the sampled gas mixture resulting within the gas space of the extraction system from the extraction of the gases dissolved in the liquid sample.

8. The system of claim 7 wherein the extraction system is formed as a hermetically sealed gas circulation system.

9. The system of claim 7 wherein said means for withdrawing a sample for analysing includes a sniffing probe.

10. The system of claim 7 further including a frit in the circulation system of the gas stream and disposed in the lower portion of the extraction chamber, said frit separating said liquid sample from said first inlet means.

11. The system of claim 7 wherein said switching means comprises,
conduit means forming a closed and connecting said outlet means to said first inlet means,
a first valve means located in said conduit means upstream of said pump means,
a pair of gas pipe means, each containing a wash-out valve, said pair of gas pipe means being connected, one on each side of said first valve means, one of said gas pipe means being connected to said source of extraction gas and the other of said pipe means exhausting said gas mixture.

* * * * *